Sept. 20, 1971 N. L. HAWKINS, JR 3,606,409
CLAMPING DEVICE
Filed Sept. 30, 1969
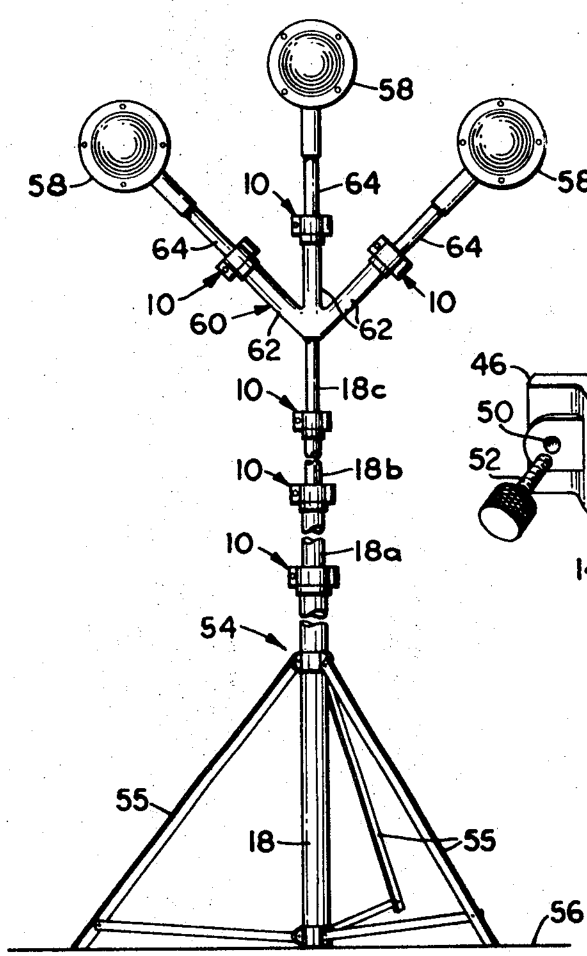
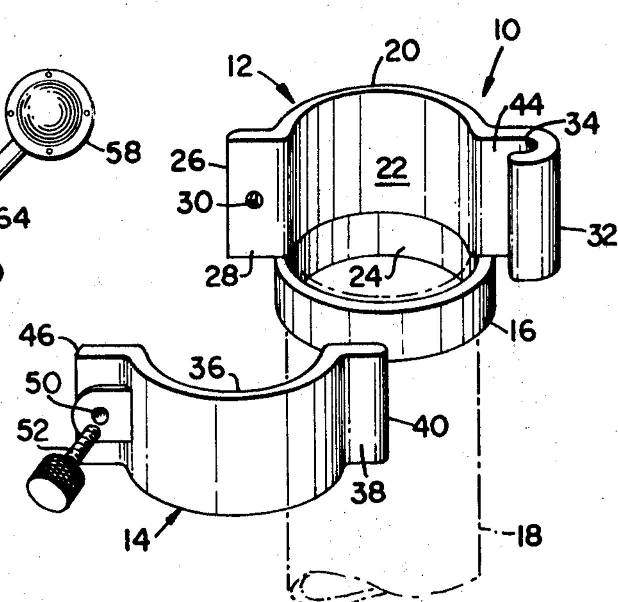
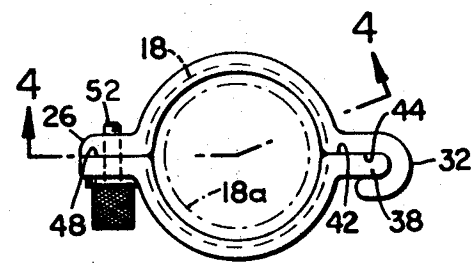
FIG_3
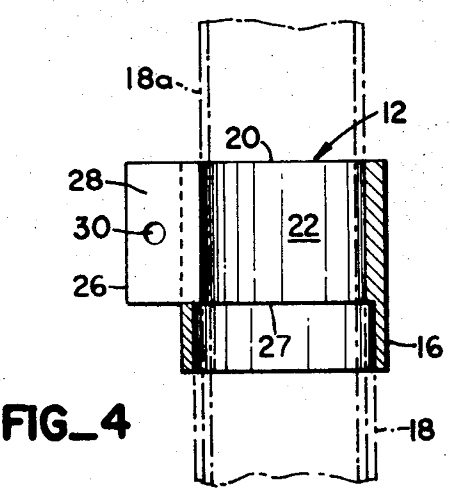
FIG_4
INVENTOR.
NORMAN L. HAWKINS, JR.
BY
Townsend and Townsend
ATTORNEYS 3,606,409

CLAMPING DEVICE

Norman L. Hawkins, Jr., Lafayette, Calif., assignor to Hawkins-Hawkins Co., Inc., Berkeley, Calif.

Filed Sept. 30, 1969, Ser. No. 862,205
Int. Cl. F16b *2/10, 7/10;* F16m *11/00*
U.S. Cl. 287—58CT 5 Claims

ABSTRACT OF THE DISCLOSURE

A device for releasably securing a first, elongated inner member to a second tubular member when the inner member is telescoped within the tubular member. The device includes a first part rigidly coupled to one end of the tubular member and a second part which mates with the first part and is releasably coupled thereto to clamp the inner member against the first member to thereby hold the members against movement relative to each other. The first part has a hook-shaped extension which receives a lateral extension on the second part, whereby the extensions form a pivot for rotating the parts relative to each other through a limited arc even though the parts are separable and can be connected together at locations substantially diametrically opposed to the extensions by a suitable fastener.

This invention relates to improvements in coupling devices and, more particularly, to a device for releasably interconnecting a pair of elongated, relatively telescoped members.

The clamping device of this invention provides a relatively simple means of releasably holding a first member against movement relative to a second member when the first member is telescoped within the second member and extends partially out of the same. The device has a pair of separable parts which are configured to permit the parts to pivot relative to each other through at least a limited arc in either direction. In this way, the parts, when moved together can be releasably connected by a suitable fastener, such as a screw, to in turn cause the telescoped member to be clamped between the parts as one of the parts is rigidly or otherwise coupled to the telescoping member. By releasing the fastener and pivoting the parts slightly away from each other, the telescoped member is released from the clamping action of the parts and can be shifted into a new position with respect to the telescoping member.

The present invention is adapted for use in any application requiring the selective positioning of a pair of relatively telescoped members. One such application is the use of the invention as a clamp for an assembly having one or more signal or warning lamps which are to be adjustably positioned on an upright stand. With such an assembly, it is oftentimes necessary or desirable to position the warning lamps at different elevations above the ground depending upon certain conditions. Generally, the stand will have a rod or tube telescoped into a second tube, the lamps being carried in some suitable manner on the rod. Heretofore, the means used to releasably interconnect the rod and the tubes at the desired height has generally been a threaded bushing which cooperates with a clutch element on the tube to cause the clutch to move into and out of gripping relationship to the rod when the bushing is rotated in opposite directions. While this structure may be suitable in operation, it is not inexpensive to produce and is subject to wear when used over extended periods of time so that its reliability is reduced, sometimes to the extent that replacement or repair becomes necessary.

The present invention provides an improvement over the conventional coupling means of the type mentioned above by providing a simple, inexpensive clamping device which is reliable over long periods of use and can be easily manipulated to permit quick adjustment of the relative positions of two relatively telescoped members without the need for special tools or special skills on the part of the user. Also, the device can be made in different sizes to correspond to the sizes of different tubular members to be interconnected. Moreover, the device can be made with the use of well-known manufacturing techniques to minimize production costs without affecting the structural integrity of the device itself.

The primary object of the invention is to provide a coupling device of improved construction for interconnecting a pair of relatively telescoped members wherein the device utilizes a pair of hingedly interconnected, separable parts which can move toward one member disposed therebetween so as to become clamped to the member when the parts are fastened together and when one of the parts is coupled to the other member to thereby quickly and easily couple the members together.

Another object of this invention is to provide a coupling device of the type described wherein one of the parts of the device has a hook-shaped extension for receiving a generally flat, lateral extension on the other part so that the parts can be hingedly interconnected and movable relative to each other at least through a limited arc to thereby allow for adjustment of the positions of the relatively telescoped members with which the device is used.

Still another object of the invention is to provide a coupling device of the aforesaid character wherein one of the parts of the device has means thereon for rigidly attaching the same to a tubular member and the second part has means for effecting a hinged attachment to the first part whereby the parts can move into clamping relationship to the member therebetween to hold it against movement relative to the other member to which one of the parts is connected.

It is a further object of this invention to provide a coupling device of the aforesaid character wherein the second part has a surface complementary to the surface of the member to be clamped.

Other objects of this invention will become apparent as the following specification progresses, reference being had to the accompanying drawing for an illustration of a perferred embodiment of the device.

In the drawing:

FIG. 1 is a side elevational view of a light-flasher warning structure using the clamping device of this invention;

FIG. 2 is a perspective view of the mounting device when the two parts thereof are separated;

FIG. 3 is a top-plan view of the device when the two parts are coupled together and in their operative positions for clamping two relatively telescoped members together; and FIG. 4 is a cross-sectional view taken along line 4—4 of FIG. 3.

The coupling or clamping device of this invention is broadly denoted by the numeral 10 and includes a pair of separable parts 12 and 14. Part 12 has an annular section 16 which is adapted to be press fitted or otherwise rigidly coupled to one end of a tubular member 18. A semi-cylindrical section 20 is integral with annular section 16 and extends axially outwardly therefrom. The cylindrical inner surface 22 of semi-cylindrical section 20 has a radius of curvature which is less than that of the cylindrical inner surface 24 of annular section 16 to present an arcuate shoulder 27 (FIG. 4) for limiting the movement of annular section 16 into the end of member 18.

Part 12 further has a lateral extension 26 which is integral with one side margin of section 20 and is substantially radially disposed relative to the central axis of section 20. Extension 26 has a flat face 28 and a threaded hole 30 therethrough.

A hook-shaped or J-shaped extension 32 is integral with section 20 at the side margin substantially diametrically opposed to extension 26. Extension 32 has a concave inner surface 34 which faces toward the central axis of section 20.

Part 14 has a substantially semi-cylindrical section 36 which is substantially complemental to section 20; i.e., its cylindrical inner surface has substantially the same radius of curvature as that of section 20. Preferably, the radius of curvature of section 36 is slightly less than the radius of curvature of second member 18*a*, so as to ensure a tight, non-slip clamping fit. A first lateral extension 38 is integral with section 36 at one side margin thereof, extension 38 being receivable within extension 32 for rotation with respect thereto through a limited arc about an axis which is substantially parallel to the central axes of sections 20 and 36. Extension 38 has a convex outer surface 40 which complementally and slidably engages the concave inner surface 34 of extension 32 to thereby permit the pivoting of part 14 with respect to part 12, yet allows such parts to be separable from each other. Also, extension 38 has a generally flat face 42 which engages the flat face 44 (FIG. 2) of extension 32 when parts 12 and 14 are in their operative positions as shown in FIG. 3.

Part 14 has a second lateral extension 46 which projects from the opposite side margin of section 36, extensions 38 and 46 being substantially coplanar relative to each other. Extension 46 has a flat face 48 (FIG. 3) which engages face 28 of extension 26 when parts 12 and 14 are in the operative positions of FIG. 3. Extension 46 further has a hole 50 therethrough for receiving a screw 52, holes 30 and 50 being in alignment when parts 12 and 14 are in the positions of FIG. 3 whereby screw 52 can be threadably received within hole 30 so as to releasably interconnect the parts.

In use, part 12 is mounted on one end of a tubular member 18 in the manner shown in FIG. 2. A second member 18*a*, such as a rod or another tube, is then telescoped into member 18 and extension 38 is then placed in the J-shaped portion of extension 32. Part 14 is then pivoted so as to bring extension 46 into proximity with extension 26, whereupon screw 52, carried in hole 50, is threaded into hole 30 so as to releasably clamp member 18*a* between parts 12 and 14 to thereby interconnect members 18 and 18*a*.

To adjust the position of member 18*a* relative to member 18, screw 52 is backed off to allow release of the clamping action of parts 12 and 14, whereupon the member 18*a* can either be moved further into or out of member 18 following which screw 52 is again tightened until parts 12 and 14 clamp member 18*a* against movement relative to member 18.

The invention is especially suitable for use with an upright stand broadly denoted by the numeral 54 and adapted to be placed on a supporting surface 56 for supporting a number of signal or warning lamps 58 in elevated positions above surface 56. The stand has a first tubular member 18, a second tubular member 18*a* a third tubular member 18*b* and a fourth member 18*c*. A coupling device 10 of a first size is mounted on the upper end of member 18; a coupling device of a second, smaller size is mounted on the upper end of member 18*a*; and a coupling device 10 of a third, smaller size is carried on the upper end of member 18*b*. The annular section 16 of the lowermost device 10 will have an inner diameter sufficient to be press fitted onto member 18. Similarly, the other two coupling devices 10 will have their annular sections 16 of diameters sufficient to receive members 18*a* and 18*b*, respectively, so as to become connected thereto. Member 18*c* need not be tubular since it carries the upper portion 60 of the stand.

Each of members 18*a*, 18*b* and 18*c* can be adjusted in height with respect to the next adjacent member therebelow by releasing the clamping action of the corresponding device 10 in the manner described above. In this way, the stand can be selectively adjusted at any one of three locations below portion 60 so as to assume any height depending upon the lengths of members 18*a*, 18*b* and 18*c*.

Upper portion 60 can also utilize devices 10 inasmuch as each of three, angularly disposed tubular extensions 62 is provided with a device 10 at its upper ends. A rod 64 carrying a warning lamp 58 at its outer end is telescoped onto a corresponding extension 62 and is releasably coupled thereto by the clamping action of the corresponding device 10. Thus, the position of each rod 64 and thereby the corresponding warning lamp 58 can be selectively adjusted as desired.

The coupling device of the present invention provides a quick release means for readily interconnecting a pair of relatively telescoped members. The device provides positive clamping action, yet the construction of the device is simple and rugged and can be made inexpensively and in different sizes to fit standard sized tubes. The device also has sufficient surface area on each of its two parts to affect a desired clamping action to thereby avoid slippage of the members interconnected thereby, whereby the device is highly reliable and has a long, operating life notwithstanding its simplicity and the ease with which it is quickly clamped to and released from the member between the parts.

I claim:

1. In combination with a pair of non-threaded, relatively telescoped members, a clamping device comprising: a first part having an annular portion thereon rigidly attached to one end of the telescoping member and a section disposed along one side of the telescoped member, said section having means defining a recess at one side margin thereof, said section defining a continuous extension of said first part through a semi-cylindrical portion; a second part having a section disposed on the opposite side of the telescoped member, said second part provided with an extension on the side thereof corresponding in outer configuration to the recess in said one side of the first part, said extension being receivable within the recess and presenting therewith a pivot means permitting said first and second parts to be rotated relative to and toward each other through at least a limited arc; and releasable interconnecting means for securing the sections of said first and second parts in frictional clamping engagement around said telescoped member to retain said pair of relatively telescoped members in rigid alignment.

2. The combination as set forth in claim 1, wherein said recess defining means comprises a J-shaped extension on the section of said first part, the extension of said second part having a convex outer surface, said J-shaped extension having a concave surface complementally engaging said convex surface.

3. The combination as set forth in claim 1, wherein the interconnecting means includes a lateral extension on each part, respectively, and a fastener for releasably interconnecting the lateral extensions of said parts.

4. The combination as set forth in claim 1, wherein said sections define a space therebetween when the same are in clamping relationship to said telescoped member, said annular portion being axially aligned with said space, said space being substantially cylindrical, the axis of rotation of said pivot means being substantially parallel to the central axis of said space.

5. The combination as set forth in claim 1, wherein each section has a semi-cylindrical inner surface, the inner surfaces of said sections being in facing relationship to each other to define a substantially cylindrical space therebetween when the sections are in proximity to each other.

References Cited

UNITED STATES PATENTS

| | | | |
|---|---|---|---|
| 1,027,929 | 5/1912 | Stryker | 285—419X |
| 1,228,323 | 5/1917 | Hudgins | 285—419 |
| 2,827,316 | 3/1958 | Duffy | 287—52 |
| 3,203,657 | 8/1965 | Thompson | 287—58CTX |

THOMAS F. CALLAGHAN, Primary Examiner

D. H. CORBIN, Assistant Examiner

U.S. Cl. X.R.

248—411; 285—302